United States Patent
Enoki et al.

(10) Patent No.: US 10,671,654 B2
(45) Date of Patent: ***Jun. 2, 2020

(54) ESTIMATING PROBABILITY OF SPREADING INFORMATION BY USERS ON MICRO-WEBLOGS

(71) Applicant: INTERNATIONAL BUSINESS MACHINES CORPORATION, Armonk, NY (US)

(72) Inventors: Miki M. Enoki, Kanagawa-Ken (JP); Akiko Suzuki, Tokyo (JP); Toyotaro Suzumura, Tokyo (JP); Michiaki Tatsubori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 539 days.

This patent is subject to a terminal disclaimer.

(21) Appl. No.: 15/203,367

(22) Filed: Jul. 6, 2016

(65) Prior Publication Data

US 2016/0314193 A1 Oct. 27, 2016

Related U.S. Application Data

(63) Continuation-in-part of application No. 13/734,556, filed on Jan. 4, 2013, now Pat. No. 9,600,825.

(51) Int. Cl.
*G06G 7/48* (2006.01)
*G06F 16/332* (2019.01)
(Continued)

(52) U.S. Cl.
CPC .......... *G06F 16/3325* (2019.01); *G06F 16/94* (2019.01); *G06F 40/20* (2020.01);
(Continued)

(58) Field of Classification Search
None
See application file for complete search history.

(56) References Cited

U.S. PATENT DOCUMENTS

2012/0150957 A1* 6/2012 Bonchi ............. G06F 17/30867
709/204
2012/0158630 A1* 6/2012 Zaman .................. G06Q 30/02
706/21

FOREIGN PATENT DOCUMENTS

JP 2002358322 A 12/2002
JP 2004-341624 12/2004
(Continued)

OTHER PUBLICATIONS

Vieweg, Sarah, et al. "Microblogging during two natural hazards events: what twitter may contribute to situational awareness." Proceedings of the SIGCHI conference on human factors in computing systems. ACM, 2010.*

(Continued)

*Primary Examiner* — Rehana Perveen
*Assistant Examiner* — Nithya J. Moll
(74) *Attorney, Agent, or Firm* — Tutunjian & Bitetto, P.C.; Vazken Alexanian

(57) ABSTRACT

Methods and systems for estimating a probability of re-sharing information include extracting keywords from a set of documents addressed to a user. The keywords from the set of documents are weighted according a metric for the user's interest in the keywords' respective source documents to create an interest model. A new document having one or more keywords is received. A likelihood that the user will re-share the new document is determined. The likelihood is based on the interest model and the one or more keywords present in the new document. The new document is automatically responded to based on the determined likelihood.

19 Claims, 5 Drawing Sheets

(51) Int. Cl.
*G06Q 50/00* (2012.01)
*G06N 7/00* (2006.01)
*G06F 16/93* (2019.01)
*G06Q 30/02* (2012.01)
*G06F 40/20* (2020.01)

(52) U.S. Cl.
CPC ............ *G06N 7/005* (2013.01); *G06Q 30/02* (2013.01); *G06Q 50/01* (2013.01)

(56) References Cited

FOREIGN PATENT DOCUMENTS

| | | |
|---|---|---|
| JP | 2006331297 | 12/2006 |
| JP | 2007018191 | 1/2007 |
| JP | 2008-134889 | 6/2008 |
| JP | 2008-293299 | 12/2008 |
| JP | 2009-020724 | 1/2009 |

OTHER PUBLICATIONS

Xu, Zhiheng, et al. "Discovering user interest on twitter with a modified author-topic model." Proceedings of the 2011 IEEE/WIC/ACM International Conferences on Web Intelligence and Intelligent Agent Technology—vol. 01. IEEE Computer Society, 2011. (Year: 2011).*

Culnan, Mary J., Patrick J. McHugh, and Jesus I. Zubillaga. "How large US companies can use Twitter and other social media to gain business value." MIS Quarterly Executive 9.4 (2010). (Year: 2010).*

* cited by examiner

US 10,671,654 B2

ESTIMATING PROBABILITY OF SPREADING INFORMATION BY USERS ON MICRO-WEBLOGS

BACKGROUND

Technical Field

The present invention relates to information spreading and, more particularly, to the estimation of a probability that information will spread in a micro-weblog ecosystem.

Description of the Related Art

Micro-weblogs (or "microblogs") are becoming an increasingly popular form of information transfer. Users share small pieces of information with the people in their social network. Such information may include status updates, links to articles, or "memes" (including links to images and/or video). Information spread in this fashion can propagate very rapidly through social networks, as individuals share the original post with their own respective networks.

While this form of information propagation is proving to be a very effective way for valuable word-of-mouth information to spread, it is also a viable medium for false rumors and malicious misinformation. Even otherwise benign feedback can take on disastrous proportions for a company that does not respond quickly enough. For example, if a false rumor, a customer complaint, etc., starts on a microblog and spreads on a large scale, it can have a significant impact on the public's perception of the target of the rumor. However, social networks are organic in nature and have a high degree of complexity, making it difficult to predict how quickly and to what extend such information will spread.

SUMMARY

A method of automatically responding to shared documents includes extracting keywords from a set of documents addressed to a user. The keywords from the set of documents are weighted according a metric for the user's interest in the keywords' respective source documents to create an interest model. A new document having one or more keywords is received. A likelihood that the user will re-share the new document is determined. The likelihood is based on the interest model and the one or more keywords present in the new document. The new document is automatically responded to based on the determined likelihood.

A method of automatically responding to shared documents is shown that includes determining a current spread of information comprising source users who have shared a target document and edge users who have received the target document. A likelihood for each user that the user will re-share the target document is determined. An estimated future information spread is projected based on the determined likelihood for each user. Determining the likelihood includes extracting keywords from a historical set of documents addressed to the user; weighting the extracted keywords from the historical set of documents according a metric for the user's interest in the extracted keywords' respective source documents to create an interest model; and determining a likelihood that the user will re-share the target document using a processor. The likelihood is based on the interest model and the one or more keywords present in the new document. The new document is automatically responded to based on the estimated future information spread.

A system for estimating a probability of re-sharing information is shown that includes a historical data table comprising a social graph map and a set of documents that each of a plurality of users have been exposed to. A keyword extraction module is configured to extract keywords from a set of documents addressed to each user. An interest model generator is configured to weight the extracted keywords according a metric for the user's interest in the keywords' respective source documents and to create an interest model from the weighted keywords. A probability estimator comprising a processor is configured to determine a likelihood that the user will re-share a new document. The likelihood is based on the interest model and one or more keywords present in the new document. A response module is configured to automatically responding to the new document based on the estimated future information spread.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Highly interconnected social networks provide a fertile breeding ground for rumors and negative feedback. When a rumor or complaint is found in a social network, it is often too late for the target to take any effective measures to counteract the rumor. However, if a complaint is caught quickly, there are options available. For example, if a customer has had a negative experience, a company can offer to resolve the user's complaints, potentially stopping the problem before it spreads. Public action in the form of a press release or advertising campaign may be more appropriate in some cases. The sooner such action is taken, the better the outcome, and as such the action may even be automated. As a result, knowing the likely progress of a rumor would help a company get ahead of the problem.

The present principles provide a way to estimate the likelihood of information being shared and re-shared in a microblog environment. Foreknowledge about the spread of information allows interested parties to plan the best response. The present principles accomplish this by, e.g., analyzing keyword frequency in users' re-shared items. Information transmitted by a user A will be spread to users who belong to an addressee user list that the user A possesses. Using a history of user A's retransmissions, the present principles build an interest model for the user that relates specific keywords to the likelihood that the user will retransmit.

Figure 1:
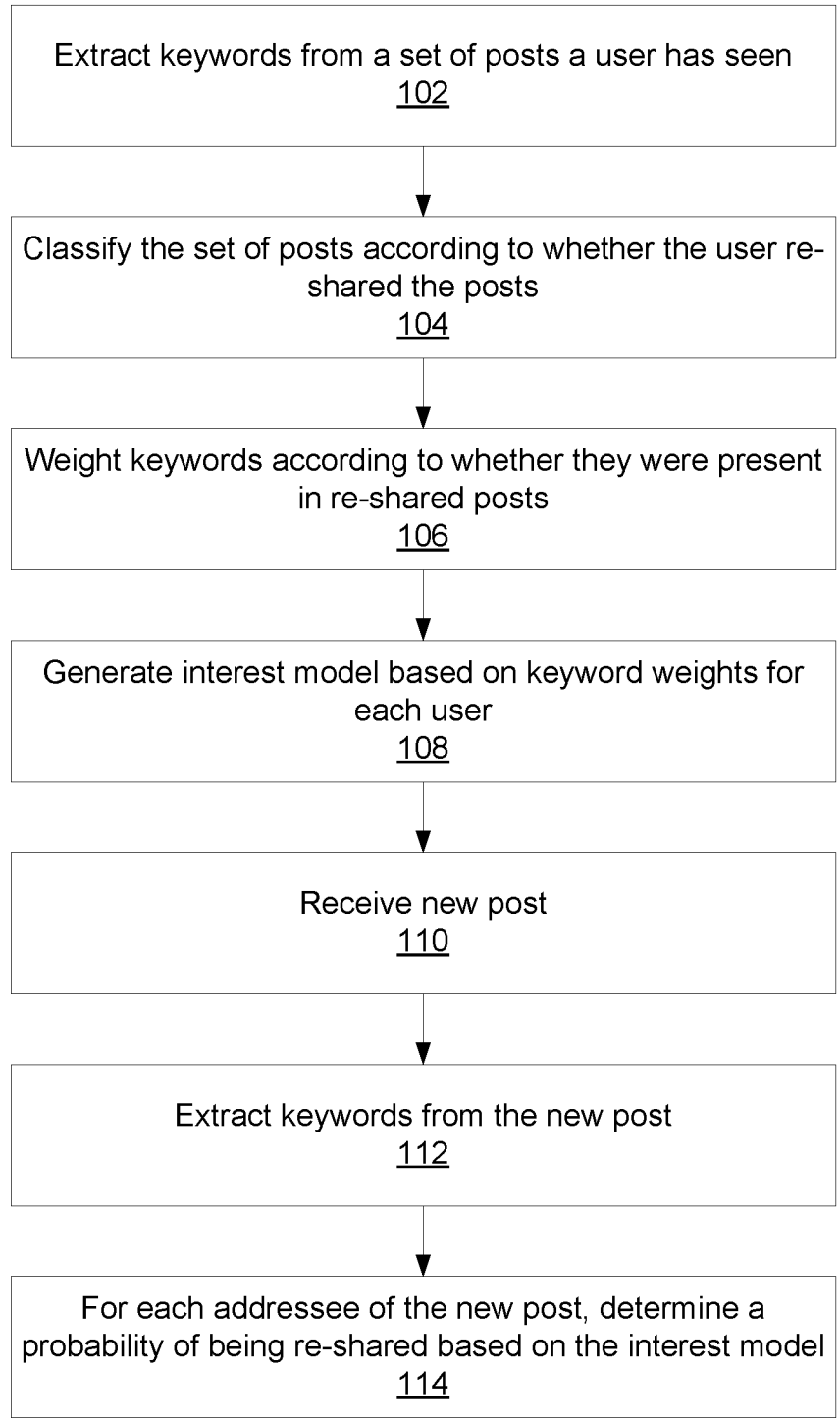
FIG. 1 is a block/flow diagram of a method for determining a probability that a user will re-share a given post in accordance with the present principles.

Referring now to the drawings in which like numerals represent the same or similar elements and initially to FIG. 1, a method for predicting whether a user will retransmit a given piece of information is shown. Block 102 takes a set of historical data for posts received by users and extracts a set of keywords from the posts. The historical data may comprise any form of information, though it is specifically contemplated that the data is at least partially textual. Additionally, the historical data may be in any appropriate format. For example, the data may be in the form of microblog posts, emails, instant messages, or any other appropriate document or medium. In making the assessment of whether a given user has seen a given post, an accurate picture of the user's social network graph at the time of the post is needed. Because social networks change frequently, this tracking is important to relate posts to actual user viewing.

Keywords may be extracted from the posts by any appropriate method and may simply tokenize posts according to, e.g., space-separation or other punctuation. Additional keyword types may include phrases (n-grams), links, and web addresses, where a domain name may be extracted from a web address and treated as a keyword. Provision may be made for removing words that are extremely common and are therefore unlikely to provide useful information (e.g., "the," "a," "I," etc.). In one specifically contemplated embodiment, only nouns are preserved as keywords. Additionally, only those words which match a preexisting list may be selected. If a keyword occurs multiple times in a given post, a count may be associated with the keyword to represent its weight within the post.

Block 104 then classifies the set of posts according to whether the user re-shared each particular post. The result is a table such as table 1 below.

TABLE 1

| Post ID | Re-posted (1: Yes) | Keywords (N-grams, co-occurrence, etc.) | | | | |
|---------|--------------------|------|-------|-------|-----|-----|
|         |                    | Band | Candy | Dance | Fan | ... |
| 32423   | 1                  | 1    | 0     | 1     | 0   | ... |
| 34432   | 0                  | 0    | 1     | 0     | 0   | ... |
| 36788   | 1                  | 0    | 1     | 0     | 1   | ... |
| 38002   | 0                  | 0    | 0     | 1     | 0   | ... |

A keyword table such as Table 1 will be created for each user according to the posts that user has received. The "Re-posted" field indicates that the user re-shared this post. A value of 1 means that the user has re-shared the post, while 0 indicates that the user have not re-shared the post. Intermediate values (i.e., those between 0.0 and 1.0) may be useful to indicate other factors related to user interest, such as the number of friends posting similar information, a number of times the user viewed the post, etc. Additionally, this value may reflect a trusted source if the post was originally from a source that the user has re-shared from in the past.

Block 106 weights the keywords for each user, according to those keywords' frequency in the user's re-shared posts. The weight of keywords that appear frequently in re-shared posts is increased, while the weight of those that rarely appear in re-shared posts is decreased. Block 108 generates an interest model for each user based on the keyword weights. An exemplary interest model is shown below in Table 2 that includes a set of users.

TABLE 2

| User ID | Keywords (N-grams, co-occurrence, etc.) | | | | |
|---------|------|-------|-------|-----|-----|
|         | Band | Candy | Dance | Fan | ... |
| 1234    | 0.8  | 0.1   | 0.6   | 0.3 | ... |
| 2345    | 0.3  | 0.0   | 0.0   | 0.9 | ... |
| 3456    | 0.2  | 0.2   | 0.0   | 0.1 | ... |
| 4567    | 0.1  | 0.1   | 0.3   | 0.5 | ... |

Each user has a weighting value between 0.0 and 1.0 associated with each keyword. It should be recognized that many factors may go into the weighting. For example, if a given keyword is not explicitly used in a post, it may nonetheless be a synonym of other keywords included in that post. As such, synonyms of keywords in re-shared posts may be given some weight in addition to those which are explicitly used.

A new post is received at block 110. Block 112 extracts keywords from the new post as described above. For each user the post is addressed to, block 114 calculates a probability that the user will re-share the post. Any appropriate formula for calculating the probability may be used. The present embodiments explicitly provide a formula based on the above interest model, but it is contemplated that other formulations may be used.

An exemplary formula for calculating a weight for a keyword j for a user u to generate the interest model in blocks 106 and 108 is:

$$q_j^{(u)} = \frac{\sum_m r^{(m)} f_j(m)}{\sum_m a(t_m) f_j(m) + C},$$

where $r^{(m)}$ is 1 if a post m was re-shared by the user u and 0 if the post m is ignored, $f_j(m)$ has a value of 1 if the keyword j appeared in a post m that was shared to the user u according to the user's social network and a valued of 0 otherwise, and $a(t_m)$ is an activity function which represents user u's activities in social media at time $t_m$. The activity function $a(t_m)$ is 0 if the user u is not using social media at the time $t_m$, while a value of 1 means that the user's is logged on and likely to see the post. This provides a normalized value for the keyword j that is associated with the user u, with a contribution to the value every time a user re-shares a post that includes a keyword. A small constant C is introduced to prevent division by zero in the event that the activity function or the weight of a keyword is zero.

The activity function can represent any appropriate metric for characterizing a level of social media activity for a user. For example, the activity function may be an average of viewing rates across a large sample set, may be measured by a microblogging or social media application, or may be calculated on a per-user basis based on replying activities (e.g., messages sent in response to other users' messages). A low activity rate, indicating that a user didn't or couldn't see a given document, implies relatively more potential for re-posting compared to a user that ignored the message. In essence, a low activity rate magnifies the effect of any re-sharing that is actually performed.

Block 114 may determine a probability for a given user u re-sharing a post t. This probability is determined as, e.g., $$P_{(u,m)} = a(t_m)\left(1 - \prod_j (1 - q_j^{(u)} f_j(m))\right),$$

where $f_j^{(u)}$ is the weight of a keyword j for the user u as described above and $f_j^{(u,t)}$ is 1 if the keyword j appeared in the post t or 0 otherwise. It is worth noting that a larger weighted value will result in a larger probability of being re-shared. In a post that includes several keywords, a particularly low-valued keyword will result in the other terms being multiplied by 1, leaving them unchanged. A single high value, however, will result in the other values being multiplied by 0, resulting in a high probability even if the other terms are low-valued.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
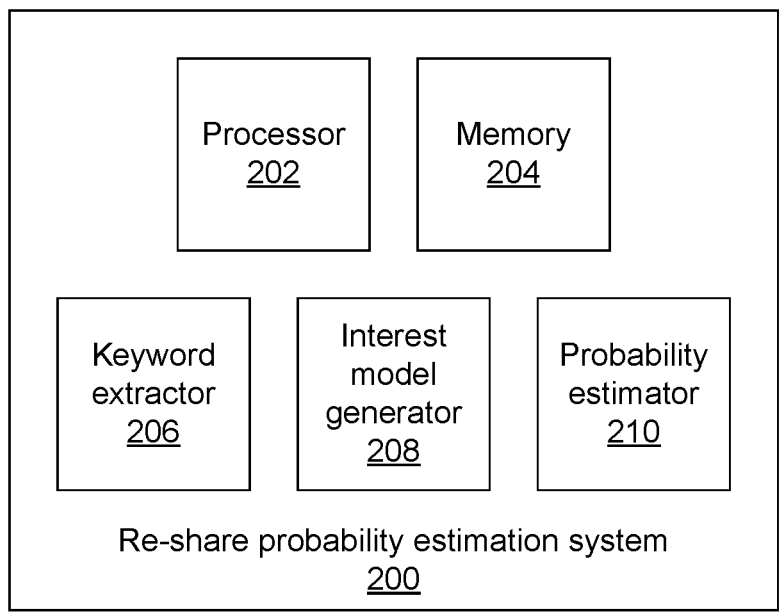
FIG. 2 is a diagram of a probability estimation system for determining a likelihood that a user will re-share a given post in accordance with the present principles.

Referring now to FIG. 2, a system 200 for estimating the probability of a user re-sharing a post is shown. A keyword extractor 206 uses processor 202 to extract keywords from historical post data stored in memory 204. This historical data includes posts that the user has seen before and considers either all of such posts or a representative sample. For example, some posts may have been kept private or may otherwise be unavailable in the historical record. The more historical data that has been stored, the more confidence one can have in the calculations discussed herein can be. A representative sample of a user's interests can be captured in as few as about 100 re-shared posts. Predictions can still be generated with smaller data sets, but it is advantageous in such cases to notify a user that such predictions lack sufficient data to form a confident prediction.

An interest model generator 208 uses processor 202 to determine weighted values for each extracted keyword. The weighted values may be calculated according to the formula set forth above, where the presence of a keyword is weighted by whether the user has re-shared posts that include the keyword. The interest model generator 208 stores the weighted values as an interest model table in memory 204. A probability estimator 210 receives a new post and uses the interest model table to determine a likelihood that the user will re-share the new post. As noted above, this probability may be determined by combining the weighted keyword values from the interest model table.

Figure 3:
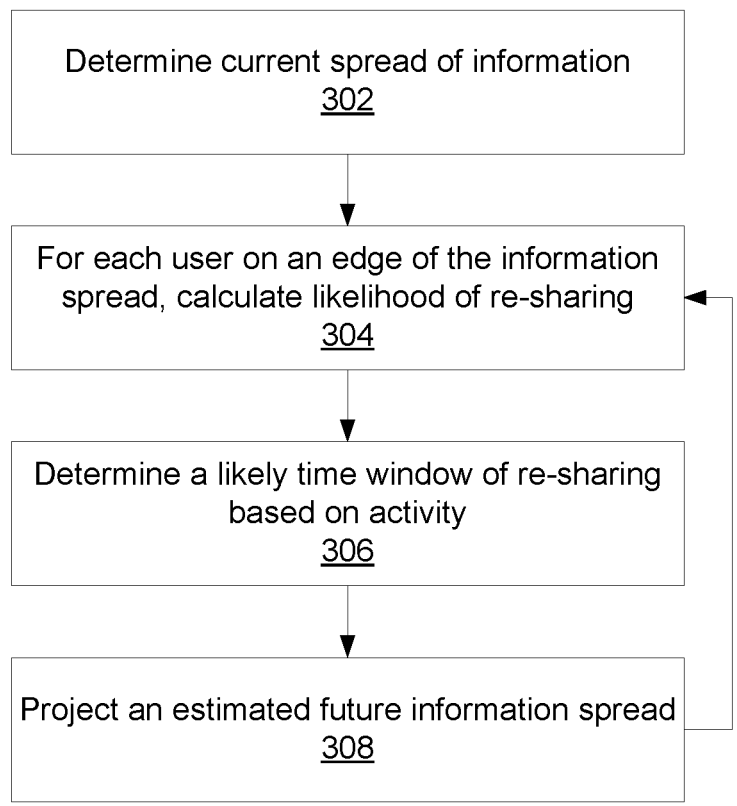
FIG. 3 is a block/flow diagram of projecting future information spread based on individual user probabilities for re-sharing a post in accordance with the present principles.

Referring now to FIG. 3, a method for estimating the spread of a particular post through a social network is shown. Block 302 determines the current spread of the information in question. This determination includes assessing a mapped social network to determine which users have shared the information in question. Under ideal circumstances, the spread of information will be limited to a single, originating user. Under most real-world applications, however, the nature of a post may not become clear until it has already begun to spread. The information spread then includes all users who have re-shared the post in question, with users on the edge of the spread being those users who receive the re-shared posts. For each edge user, block 304 calculates a likelihood of that user re-sharing the post as described above.

Block 306 optionally determines a likely time window for a given user re-sharing a post. This time window is based on historical data regarding the user's activity. A frequent user will have a relatively close time window for re-sharing, because the user frequently checks for updates, and if that time window passes it can be reasonably assumed that the user has seen the post and chosen not to re-share it. Other users may only check during certain times of the day. For example, if the user usually shares posts in the evening, then a post shared with the user in the morning likely will not be re-shared until later in the day. For users with more sporadic usage habits, the time window may be represented as a time-decay function, as the sporadic user is more likely to re-share a recent post than one that has grown stale.

Block 308 projects an estimated future information spread for the post. This projection includes a determination of the likelihood that each edge user will re-share the post and may be modified by the time window generated by block 306. If no time windows are generated, then an information spread may be generated that merely reflects overall spread without regard to the timing or progression of that spread. The projected future information spread is used as a basis for additional iterations. Block 304 finds likelihoods of re-sharing for each of the edge users on the new edge.

Social networks are highly interconnected. Two immediate consequences of this fact are that the number of users exposed grows very quickly. Each user may have, e.g., one hundred directly connected people in their local network. However, many of those users will be connected to each other. As such, as the information spread increases and re-crosses users who have previously been evaluated for their re-sharing potential, those users need not be assessed again. This constrains the otherwise exponential growth of the social network graph and makes the calculations tractable.

Figure 4:
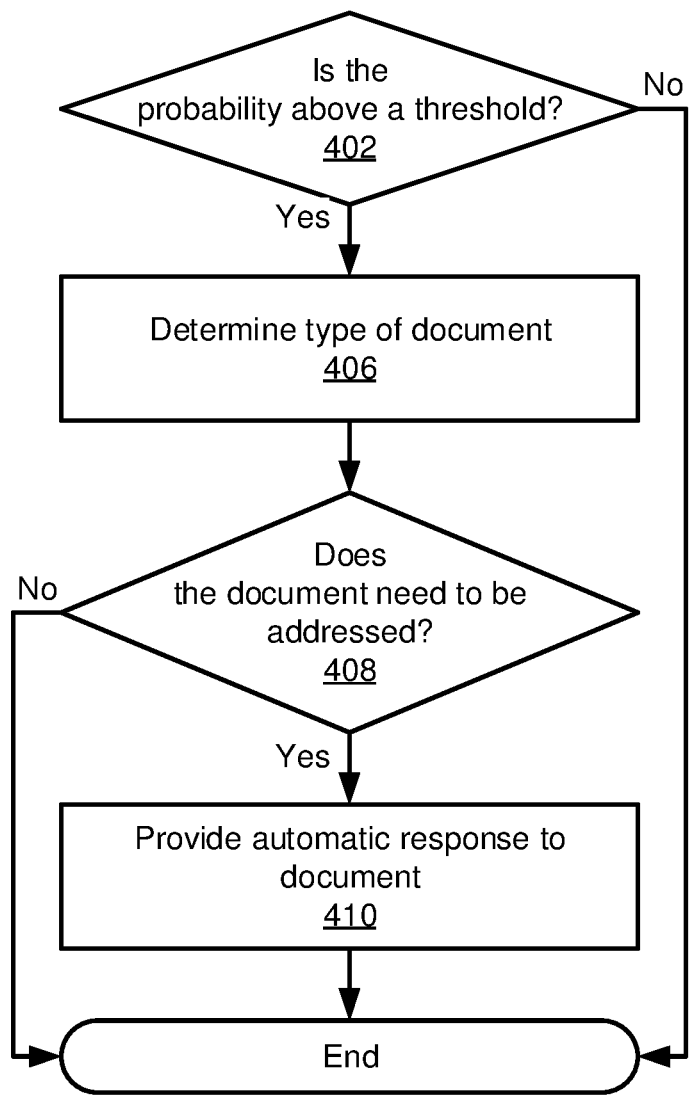
FIG. 4 is a block/flow diagram of automatically responding to a document in accordance with the present principles.

Referring now to FIG. 4, a method for automated response to a document that is determined to be likely to be re-shared. Block 402 compares the probability of a document being re-shared (e.g., such as is determined in block 114) to a threshold. If the probability is above a threshold, block 406 determines the type of document. In this context, "type of document" refers to the type of information in the document. For example, the type of document may be a complaint, a review, a question, general information, feedback on a product or service, etc. The type of document can be determined by any appropriate mechanism. For example, semantic analysis can determine the textual content of the document based on structural relationships between words and lexical meanings. The analysis of the document can furthermore be performed using machine learning techniques, where a large corpus of annotated documents are used to train, for example, a neural network or other classifier that can subsequently determine the type of document.

Based on the type of document, block 408 determines whether the document needs to be addressed. For example, a positive social media post (e.g., praising a product) does not necessarily need to be addressed, while a negative social media post should be addressed as quickly as possible if it is likely to spread. The types of document that need to be addressed may be set by the user in accordance with their needs and preferences.

If the document does need to be addressed, block 410 provides an automatic response to the document. This response may take the form of a pre-written message and may include, for example, coupons or discount information to placate an angry customer. The automatic response may also include more complicated actions such as, e.g., the release of information through other channels to decrease the sting of a negative review or the release of a press release that addresses a known issue. This action may be performed automatically and immediately upon detection of the document to provide the fastest response possible. Human intervention may also be used to assess the effect of the automatic response and to provide second-tier support and ongoing feedback.

Figure 5:
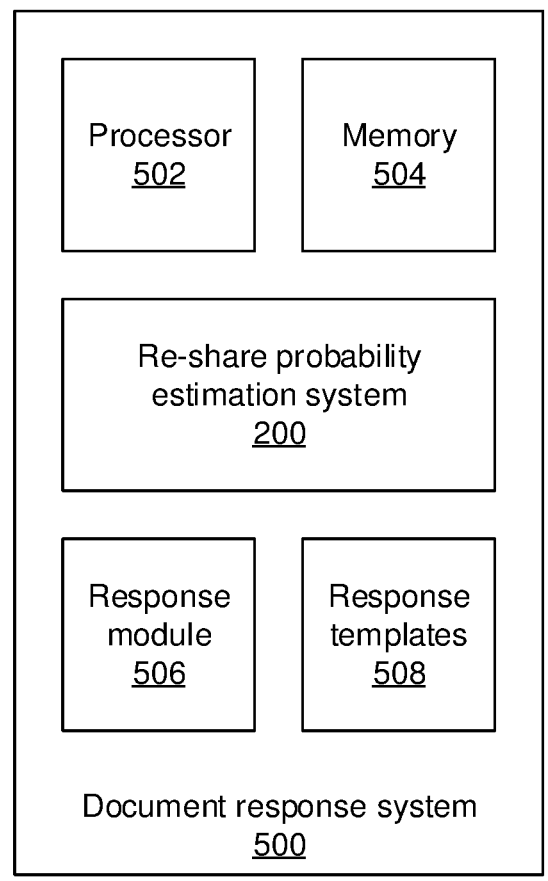
FIG. 5 is a block diagram of a system for automatically responding to a document in accordance with the present principles.

Referring now to FIG. 5, a document response system 500 is shown. The document response system 500 includes a hardware processor 502 and a memory 504. The document response system 500 furthermore includes the re-share probability estimation system 200, which may share use the processor 502 and memory 504 as its own or may, alternatively, have separate a processor and memory. The document responses system 500 furthermore includes one or more functional modules that may be implemented as software that is stored in memory 504 and is executed by hardware processor 502. In an alternative embodiment, the functional modules may be implemented as one or more discrete hardware components in the form of, e.g., an application specific integrated chip or a field programmable gate array.

In particular, the document response system 500 includes a response module 506 that uses the information generated by the re-share probability estimation system 200 to determine whether to respond to a document that has been shared. If a response is needed, the response module 506 may use one or more response templates 508 that are stored in memory 504 to generate and issue an automatic response to the document as described above.

Figure 6:
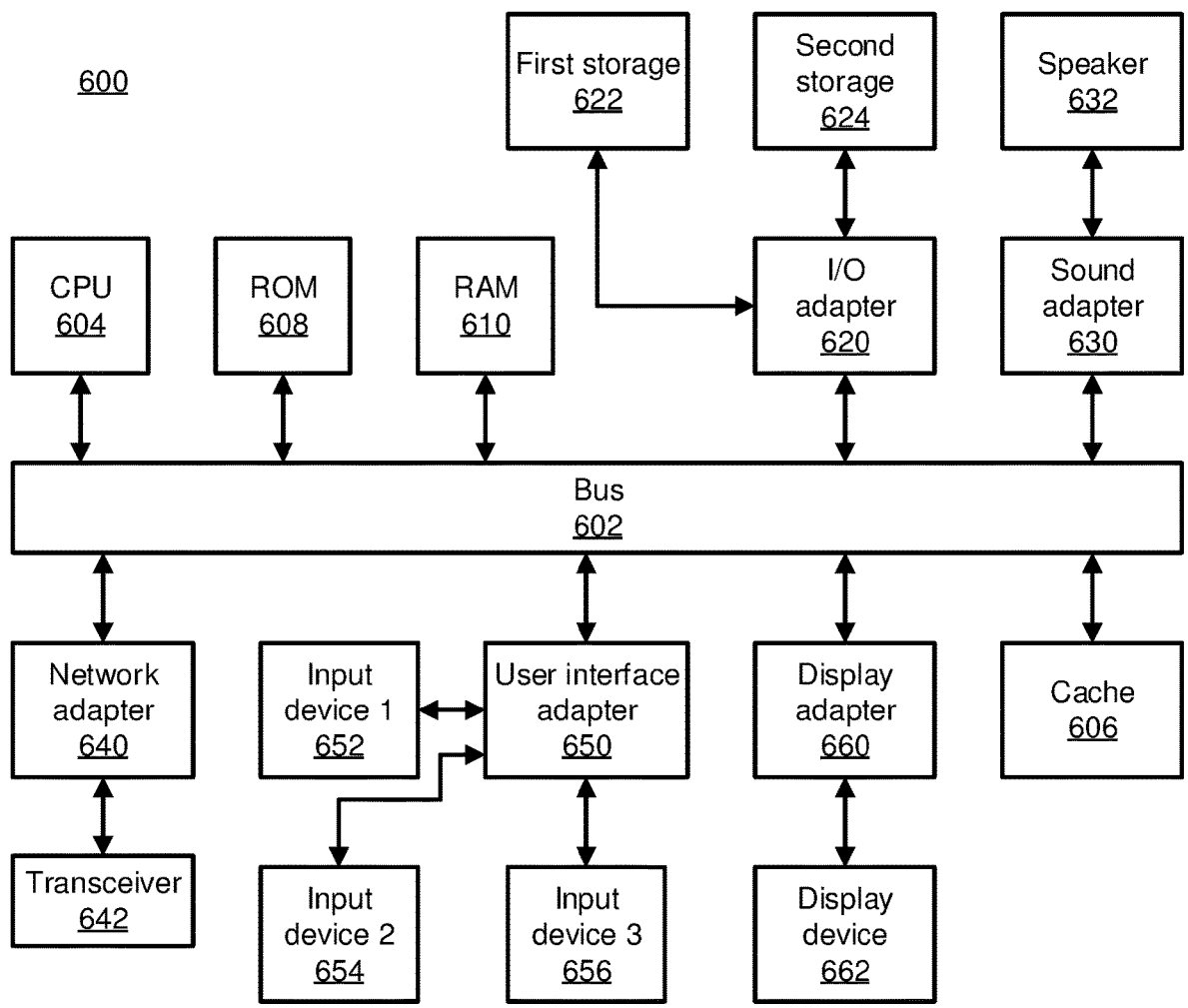
FIG. 6 is a block diagram of a processing system in accordance with the present principles.

Referring now to FIG. 6, an exemplary processing system 600 is shown which may represent the re-share probability estimation system 200 or the document response system 500. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Having described preferred embodiments of a system and method for estimating the probability of spreading information by users on micro-weblogs (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of automatically responding to shared documents, comprising:
   extracting keywords from a set of documents addressed to a user;
   weighting the keywords from the set of documents according a metric for the user's interest in the keywords' respective source documents to create an interest model; receiving a new document having one or more keywords;
   determining a likelihood that the user will re-share the new document using a processor, said likelihood being based on the interest model and the one or more keywords present in the new document; and
   automatically responding to the new document based on the determined likelihood;
   wherein automatically responding to the new document comprises automatically performing an action based on the determined likelihood using a processor, said action being selected from the group consisting of addressing a complaint in the new document, issuing a press release, and initiating an advertising.

2. The method of claim 1, weighting a keyword comprises calculating a weight based on a proportion of documents including the keyword that were re-shared by the user.

3. The method of claim 2, wherein weighting a keyword comprises increasing the weight of a re-shared keyword in inverse proportion to a level of activity for the user that reflects a likelihood that the user sees a given document.

4. The method of claim 2, wherein weighting a keyword comprises calculating a weight according to:

$$q_j^{(u)} = \frac{\sum_m r^{(m)} f_j(m)}{\sum_m a(t_m) f_j(m) + C},$$

where $r^{(m)}$ is 1 if a post m was re-shared by the user u and 0 if the post m is ignored, where $f_j(m)$ is 1 if the keyword j appeared in a post m and is 0 otherwise, where $a(t_m)$ is an activity function at time $t_m$, and where C is a small constant.

5. The method of claim 1, wherein determining a likelihood comprises calculating a probability that the user will re-share the new document as:

$$P_{(u,m)} = a(t_m)\left(1 - \prod_j \left(1 - q_j^{(u)} f_j(m)\right)\right),$$

where $a(t_m)$ is a user's activity at a time t associated with a post m, $f_j(m)$ is 1 if the keyword j appeared in the post m and is 0 otherwise and where $q_j^{(u)}$ is a weighted value for the keyword j for the user u.

6. The method of claim 1, wherein the keywords match a set of specific predetermined keywords.

7. The method of claim 1, wherein the keywords include at least one web address.

8. The method of claim 1, embodied as a computer readable program on a non-transitory computer readable storage medium, wherein the computer readable program when executed on a computer causes the computer to perform the steps of claim 1.

9. A method of automatically responding to shared documents, comprising:
   determining a current spread of information comprising source users who have shared a target document and edge users who have received the target document;
   for each edge user, determining a likelihood that the user will re-share the target document, by:

extracting keywords from a historical set of documents addressed to the user;

weighting the extracted keywords from the historical set of documents according a metric for the user's interest in the extracted keywords' respective source documents to create an interest model; and determining a likelihood that the user will re-share the target document using a processor, said likelihood being based on the interest model and the one or more keywords present in a new document; and projecting an estimated future information spread based on the determined likelihood for each user; and automatically responding to the new document based on the estimated future information spread;

wherein automatically responding to the new document comprises automatically performing an action based on the determined likelihood using a processor, said action being selected from the group consisting of addressing a complaint in the new document, issuing a press release, and initiating an advertising.

10. The method of claim 9, weighting a keyword comprises calculating a weight based on a proportion of documents including the keyword that were re-shared by the user.

11. The method of claim 10, wherein weighting a keyword comprises increasing the weight of a re-shared keyword in inverse proportion to a level of activity for the user that reflects a likelihood that the user sees a given document.

12. The method of claim 10, wherein weighting a keyword comprises calculating a weight according to:

$$q_j^{(u)} = \frac{\sum_m r^{(m)} f_j(m)}{\sum_m a(t_m) f_j(m) + C},$$

where $r^{(m)}$ is 1 if a post m was re-shared by the user u and 0 if the post m is ignored, where $f_j(m)$ is 1 if the keyword j appeared in a post m and is 0 otherwise, where $\alpha(t_m)$ is an activity function at time $t_m$, and where C is a small constant.

13. The method of claim 9, wherein determining a likelihood comprises calculating a probability that the user will re-share the target document as:

$$P_{(u,m)} = a(t_m)\left(1 - \prod_j (1 - q_j^{(u)} f_j(m))\right),$$

where $a(t_m)$ is a user's activity at a time t associated with a post m, $f_j(m)$ is 1 if the keyword j appeared in the historical document m and is 0 otherwise and where $q_j^{(n)}$ is a weighted value for the keyword j for the user u.

14. The method of claim 9, further comprising determining a time window in which edge user is most likely to re-share the target document.

15. The method of claim 9, further comprising repeating said steps of determining a likelihood for each edge user and projecting an estimated future information spread, where the edge users in each iteration are based on the estimated future information spread of the previous iteration.

16. The method of claim 9, embodied as a computer readable program on a non-transitory computer readable storage medium, wherein the computer readable program when executed on a computer causes the computer to perform the steps of claim 9.

17. A system for automatically responding to shared documents, comprising:

a historical data table comprising a social graph map and a set of documents that each of a plurality of users have been exposed to;

a keyword extraction module configured to extract keywords from a set of documents addressed to each user;

an interest model generator configured to weight the extracted keywords according a metric for the user's interest in the keywords' respective source documents and to create an interest model from the weighted keywords;

a probability estimator comprising a processor configured to determine a likelihood that the user will re-share a new document, said likelihood being based on the interest model and one or more keywords present in the new document; and a response module configured to automatically respond to the new document based on the determined likelihood;

wherein automatically responding to the new document comprises automatically performing an action based on the determined likelihood using a processor, said action being selected from the group consisting of addressing a complaint in the new document, issuing a press release, and initiating an advertising.

18. The system of claim 17, wherein the interest model generator is further configured to calculate a weight for a keyword based on a proportion of documents including the keyword that were re-shared by the user.

19. The system of claim 18, wherein the interest model generator is further configured to increase the weight of a re-shared keyword in inverse proportion to a level of activity for the user that reflects a likelihood that the user sees a given document.

* * * * *